US010247541B2

United States Patent
Ni et al.

(10) Patent No.: US 10,247,541 B2
(45) Date of Patent: Apr. 2, 2019

(54) SYSTEM AND METHOD OF ESTIMATING THE THREE-DIMENSIONAL SIZE OF AN OBJECT FOR PACKAGING OR STORING THE OBJECT

(71) Applicants: Sze-Yao Ni, Taipei (TW); Tom C.-I. Lin, Taipei (TW); Wen-Hsiung Lin, Taipei (TW)

(72) Inventors: Sze-Yao Ni, Taipei (TW); Tom C.-I. Lin, Taipei (TW); Wen-Hsiung Lin, Taipei (TW)

(73) Assignee: Gorilla Technology Inc., Taipei (TW)

( * ) Notice: Subject to any disclaimer, the term of this patent is extended or adjusted under 35 U.S.C. 154(b) by 16 days.

(21) Appl. No.: 14/464,706

(22) Filed: Aug. 21, 2014

(65) Prior Publication Data
US 2015/0276379 A1 Oct. 1, 2015

Related U.S. Application Data

(60) Provisional application No. 61/973,217, filed on Mar. 31, 2014.

(51) Int. Cl.
| | |
|---|---|
| *G06T 7/62* | (2017.01) |
| *G01B 11/02* | (2006.01) |
| *G06T 7/73* | (2017.01) |
| *G06T 7/564* | (2017.01) |

(52) U.S. Cl.
CPC ............ *G01B 11/022* (2013.01); *G06T 7/564* (2017.01); *G06T 7/62* (2017.01); *G06T 7/74* (2017.01)

(58) Field of Classification Search
None
See application file for complete search history.

(56) References Cited

U.S. PATENT DOCUMENTS

| | | | | |
|---|---|---|---|---|
| 2005/0267791 A1* | 12/2005 | LaVoie | ................... | G06Q 10/04 705/7.31 |
| 2007/0168153 A1* | 7/2007 | Minor | .................... | G01B 11/02 702/158 |
| 2011/0149071 A1* | 6/2011 | Oggier | .......................... | 348/140 |
| 2013/0201210 A1* | 8/2013 | Vaddadi et al. | .............. | 345/632 |
| 2013/0293539 A1* | 11/2013 | Hunt | ....................... | G06T 17/20 345/420 |
| 2014/0270540 A1* | 9/2014 | Spector et al. | ................ | 382/199 |
| 2015/0015700 A1* | 1/2015 | Becker et al. | ................. | 348/136 |
| 2015/0015895 A1* | 1/2015 | Bridges et al. | ................ | 356/614 |
| 2015/0109420 A1* | 4/2015 | Masuda | ........................... | 348/47 |
| 2015/0154453 A1* | 6/2015 | Wilf | ............................. | 382/103 |
| 2015/0360801 A1* | 12/2015 | Sytema | ................ | B65D 5/6664 53/74 |

\* cited by examiner

*Primary Examiner* — Dwayne D Bost
*Assistant Examiner* — Jiangeng Sun
(74) *Attorney, Agent, or Firm* — Min-Lee Teng; Litron Patent & Trademark Office

(57) ABSTRACT

The invention discloses a system and method for estimating a three-dimensional (3D) packaging size of an object. The method has a self calibration function to correct the scale in the measurement environment so as to reduce errors caused by human operations. The system comprises an image capture unit for capturing images of the measurement environment and objects; a scale correction unit for performing the calibration using a reference object of a known size; and an object size estimation unit for detecting the position of an object to be estimated in the image data received from the image capture unit and estimating the 3D size of the object according to the calibrated scale.

8 Claims, 9 Drawing Sheets

SYSTEM AND METHOD OF ESTIMATING THE THREE-DIMENSIONAL SIZE OF AN OBJECT FOR PACKAGING OR STORING THE OBJECT

CROSS-REFERENCE TO RELATED APPLICATION

This application claims the benefit of U.S. provisional application 61/913,217 filed Mar. 31, 2014, the disclosure of which is incorporated herein in its entirety by reference.

BACKGROUND OF THE INVENTION

1. Field of the Invention

The present invention generally relates to an estimation system, and in particular relates to a three-dimensional (3D) object size estimation system for object wrapping.

2. Description of the Prior Art

Traditionally, integrating information of sizes of freight and luggage is mainly handled through manual operation; the sizes of objects are measured sequentially through manual operation according to separately defined standard operating procedures, after which the measured data is then recorded in electronic formats for subsequent logistics operations. Obtaining information of features of various objects through manual operation is time-consuming and requires a lot of man-power, adding burden to the cost of business. Therefore, how to construct an automatic system to obtain 3D size information of a three-dimensional object for industries, such as transportation, logistics and storage, is an important topic.

Traditional ways to measure the size of an object include using laser, thermal imaging, and etc. Such traditional ways use the technology of computer vision to analyze images for obtaining the size of the object. For example, a patent publication, US20130188042, discloses a way that uses images of multiple views to rebuild the location information of an object in a 3D space to obtain the size of the object. In addition, a patent publication, US20120224052, discloses another way that uses a camera of a portable electronic device to capture images of an object while at the same time, scale and depth information of space are provided to estimate the size of the object. Furthermore, a patent publication, US20120120198, discloses yet another way to build a relation model between images and space to build a space model of an object so that the space information of the object can be obtained for measuring the size of the object. However, the conventional ways to obtain information of an object is through image analysis, and therefore spatial scale information provided by users must be integrated in order to obtain the scale information in the real world, which requires clicking the image manually to mark the image locations in the scale, while at the same time, the scale information of the real word relative to the image locations are inputted so that an algorithm can be used to calculate the size of the object size according to afore-mentioned information.

Although setting the scale manually allows the user to choose landmark locations in the environment scale arbitrarily (distance between landmark locations), it cannot provide pixel positions of the images corresponding to a particular corner of the object with desired features quickly and accurately. Furthermore, the pixel locations that are set manually will exhibit some differences from the pixel locations that are detected by the algorithm, and the user cannot correct the scale effectively according to the differences, which eventually causes errors in the measurement result.

In addition, the traditional ways utilize locations of the object in images to construct a three-dimensional model of the object according to the detected object and the scale set by the user, so that the three-dimensional model can be used to measure the size of an object. Although the three-dimensional model is able to measure the size of the object more accurately, it takes considerable computation and a complex algorithm to obtain the measurement result, which is not practical in applications, and in particular not feasible for some real-time applications. Furthermore, the three-dimensional model is not necessary for some applications, such as transportation, logistics, storage, and etc, which only need an approximate space that is taken by the object instead of knowing the precise 3D size of the object.

SUMMARY OF THE INVENTION

One objective of the present invention is to quickly estimate an approximate spatial size that is occupied by an object without needing to know the precise 3D size of the object for applications such as object wrapping and storage space allocation.

The present invention provides a system and a method that utilizes a self-calibration function to correct a scale for measuring the spatial size occupied by an object, thereby preventing inconsistency between manual operations and errors in the measurement results. The present invention obtains the spatial scale information by imaging a reference object with a known length, a known width and a known height for correcting the scale in the measurement environment, and applies an algorithm to establish a virtual rectangular space with any size and rotation angle in the virtual image 3D space, and then utilizes image processing technology to detect the position of the object in the image and matches the virtual rectangular space with the position of the object to estimate the spatial size occupied by the object.

In one embodiment, a system of estimating the three-dimensional size of an object for object wrapping is disclosed, wherein the system comprises an image capturing unit, for capturing image data of a measurement environment and objects in the measurement environment; a scale correction unit, operative to utilize image data of a reference object with a known length, a known width and a known height in the measurement environment to obtain spatial scale information for correcting a scale; and an object size estimation unit, operative to receive image data of an object to be estimated from the image capturing unit for detecting in the received image data a position of the object to be estimated in the measurement environment and to use a predetermined shape having a spatial size being measurable by the corrected scale to enclose the object to be estimated so as to estimate the three-dimensional size of the object to be estimated according to the spatial size of the predetermined shape.

In one embodiment, the 3D object size estimation system of the present invention can be implemented in a computer or a portable electronic device such as a hand-held mobile device. In one embodiment, the 3D object size estimation system of the present invention comprises a processor, a user interface, and a display device. The processor is operative to perform all calculations for image and space transformation. The user can set information via the user interface. The display device is operative to display the information from the user interface as well as the measurement results. The user interface and the display device can be used to set related information for the measurement environment, or the known length, width, and height of the reference object for adjusting the scale of the 3D object size estimation system. In addition, the system can be integrated with a database, so that the system can collect and organize the electronic information of object features efficiently.

In one embodiment, a system of estimating the three-dimensional size of an object for object wrapping is disclosed, wherein the system comprises: an image capturing unit, for capturing image data of a measurement environment and objects in the measurement environment; a scale correction unit, operative to utilize image data of a reference object with a known length, a known width and a known height in the measurement environment to obtain spatial scale information for correcting a scale; and an object size estimation unit, operative to receive image data of an object to be estimated from the image capturing unit for detecting in the received image data a position of the object to be estimated in the measurement environment and estimating the three-dimensional size of the object to be estimated according to the corrected scale.

In one embodiment, a method of estimating the three-dimensional size of an object for object wrapping is disclosed, the method comprising: obtaining image data of a measurement environment and a reference object in the measurement environment; correcting a scale according to the reference object with a known length, a known width and a known height in the image data to obtain spatial scale information for the measurement environment; and obtaining image data of the measurement environment and an object to be estimated in the measurement environment; and detecting a position of the object to be estimated in the measurement environment in said image data and estimating the three-dimensional size of the object to be estimated according to the corrected scale.

In one embodiment, a system of estimating the three-dimensional size of an object based on a cloud computing service infrastructure is disclosed, the system comprising: an image capturing unit, disposed in a client of the cloud computing service infrastructure, for capturing image data of a measurement environment and objects in the measurement environment; a scale correction unit, disposed in a server of the cloud computing service infrastructure, operative to utilize image data of a reference object with a known length, a known width and a known height in the measurement environment to obtain spatial scale information for correcting a scale; and an object size estimation unit, disposed in a server of the cloud computing service infrastructure, operative to receive image data of an object to be estimated from the image capturing unit for detecting in the received image data a position of the object to be estimated in the measurement environment and estimating the three-dimensional size of the object to be estimated according to the corrected scale.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
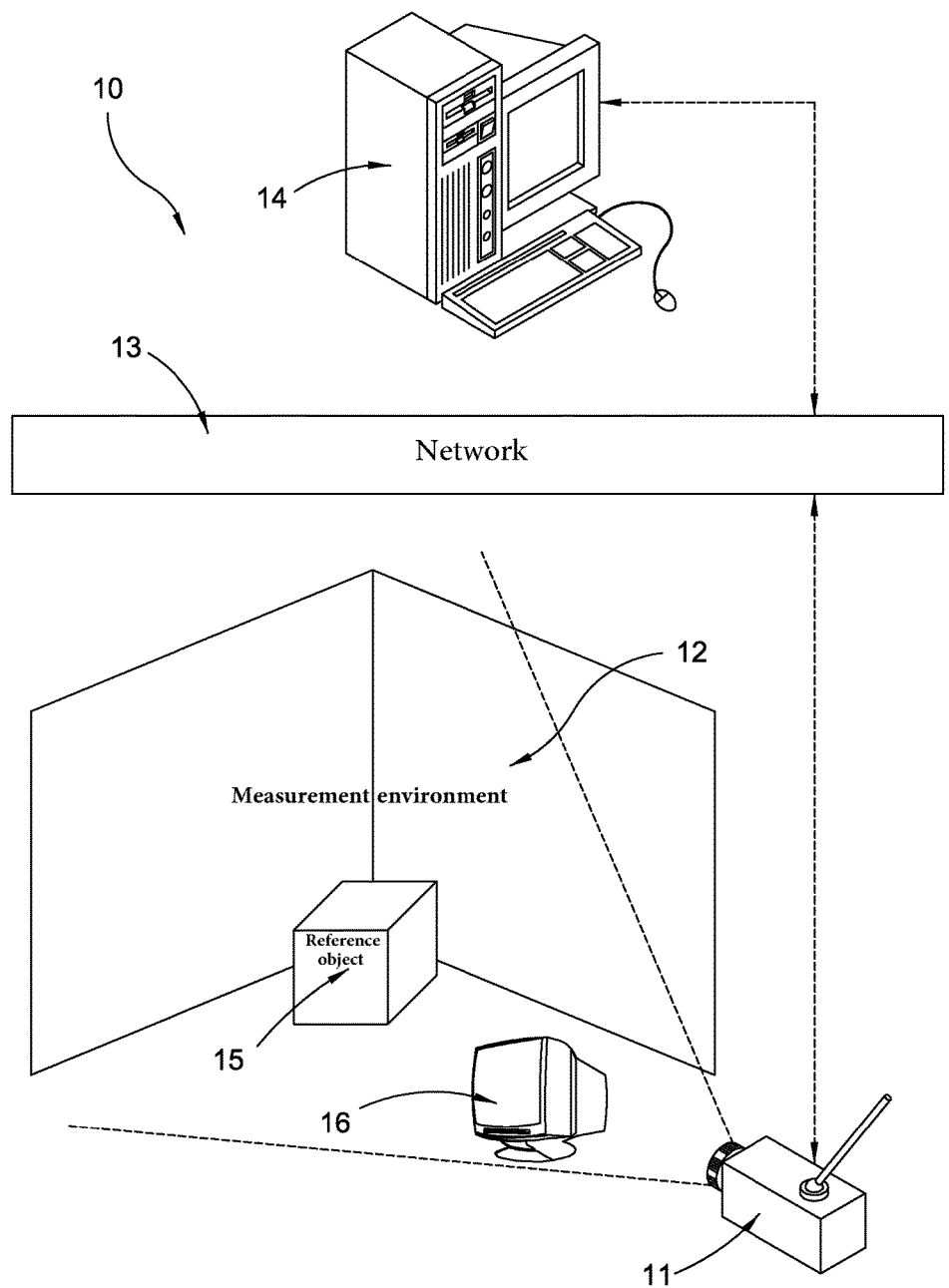
FIG. 1 is a schematic view of a system for estimating three-dimensional packaging size of an object in accordance with one embodiment of the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 which is a schematic view of an image based object wrapping estimation system 10 which utilizes a single camera to perform self-calibration. In the operation flow, an image capturing unit constructed by camera device 11 is used to obtain the image data of a measurement environment 12. The image capturing unit utilizes a camera having lens to capture images and incorporates image capturing, analyzing, recognition and communication functions. The camera device 11 can transmit image data to a system host 14 via a network 13, such as a local area network or the internet. A reference object 15 is placed in the measurement environment 12. The reference object 15 has a size of a known length, a known width and a known height, and is a rigid body with nondeformable characteristics. The reference object 15 has a rigid body in the shape of cuboid or cubic. That is, the outer surface of the rigid body can be a rectangular of any size or a square with a specific length on each side. After receiving the image data of the reference object 15, the image capturing unit extracts the area where the reference object 15 is located in the image. The extracted area information and the size of the reference object 15 are transmitted to a scale correction unit of the system host 14 for further calculation to establish a back-projection model between the object image and the measurement environment, so that the correspondence between pixels of the image and the measurement environment 12 can be obtained and self-calibration for the measurement environment 12 can be completed. When an object 16 with an unknown 3D size is measured, the image capturing unit obtains the image of the object be estimated 16, and the image data of the object to be estimated 16 can also be transmitted to the system host 14 via the network 13. The system host 14 also comprises an object size estimation unit which is operative to operative to receive image data of the object to be estimated from the image capturing unit. The object size estimation unit detects a position of the object to be estimated in the measurement environment and searches for a minimal back-projection model capable of covering the area of the object image by adjusting the three-dimensional parameters of the established back-projection model, so as to obtain the spatial size occupied by the object in the measurement environment and estimate the size of the minimal rectangular space for wrapping the object to be estimated 16.

The image based object wrapping estimation system 10 can be applied in the system having a cloud computing service infrastructure. The camera device 11 disposed in a client of the cloud computing service infrastructure, as shown in FIG. 1, is used to capture the measurement environment 12 and the image data of the reference object 15 and the object 16 via a network 13. The image data is transmitted to system host 14 disposed in a server of the cloud computing service infrastructure, as shown in FIG. 1. An scale correction unit in the server is utilized to obtain spatial scale information of the measurement environment 12 in the client, to find a correspondence between the image of the reference object 15 and the measurement environment to construct a back-projection model between the measurement environment and object images, so that the self-calibration of the measurement environment 12 can be completed. The system host 14 installed in the server of the cloud computing service infrastructure further comprises an object size estimation unit. The object size estimation unit can adjust the three-dimensional of size of the established back-projection model to obtain a back-projection model capable of covering the object image by a minimal area, to estimate the spatial size occupied by the object 16. The feature information of the exterior appearance of the object 16 can also be captured as well; and the information can be recorded in a general database or cloud database, and the records can be further provided to subsequent processes for performing cost analysis or object status tracking.

Figure 2:
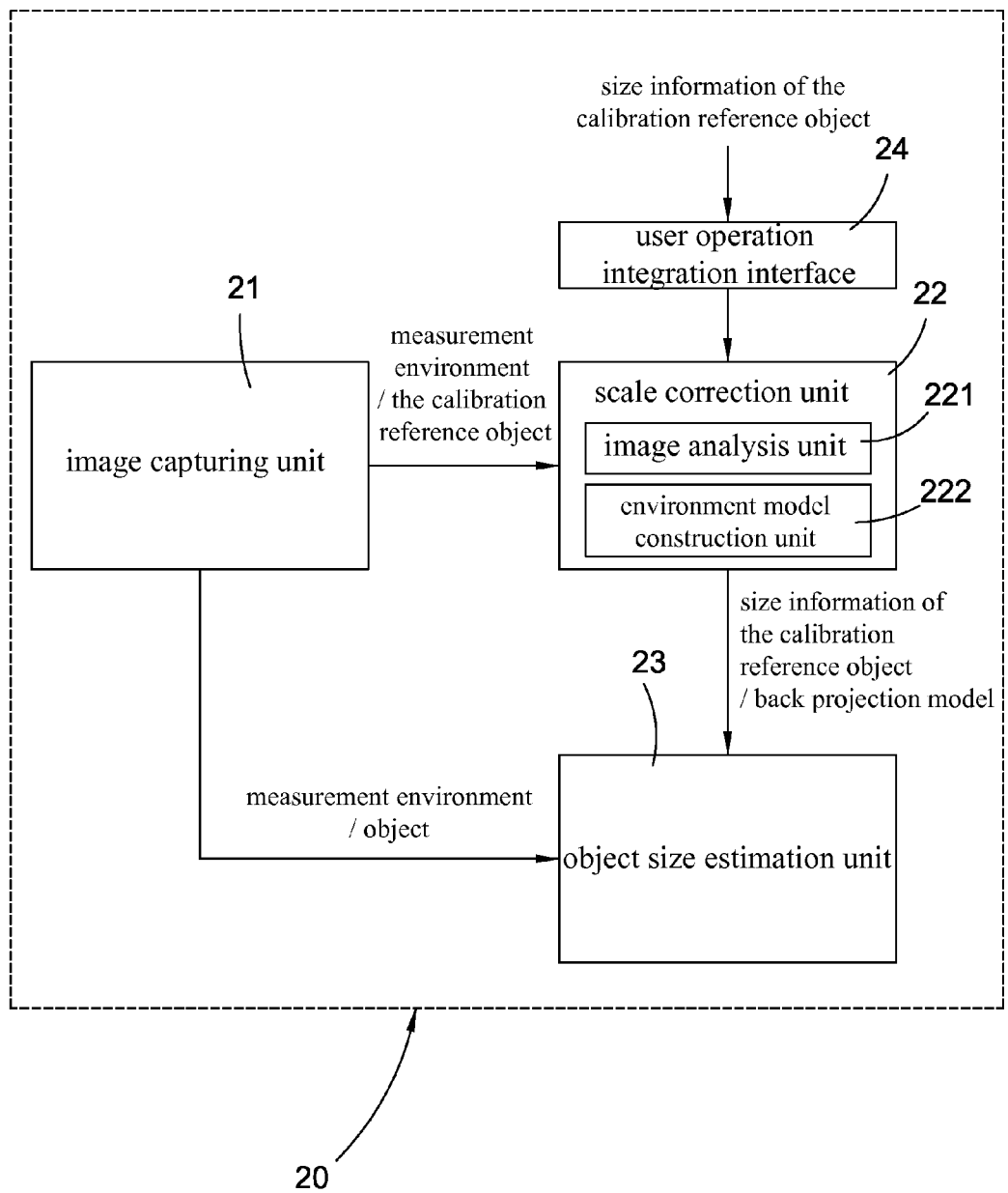
FIG. 2 is a block diagram of the system for estimating three-dimensional packaging size of an object in accordance with one embodiment of the present invention.

Please refer to FIG. 2 for understanding the structure of a 3D object size estimation system 20 of in accordance with one embodiment of the present invention. The 3D object size estimation system 20 mainly comprises an image capturing unit 21, a scale correction unit 22 and an object size estimation unit 23. An embodiment of the 3D object size estimation system can be implemented in a computer or a hand held mobile device. The image capturing unit 21 can capture image data of the measurement environment 12 and the reference object 15, or the image data of the measurement environment 12 and the object 16. The image data of measurement environment 12 and the reference object 15 is transmitted to the scale correction unit 22; and the image data of the measurement environment 12 and the object 16 is transmitted to the object size estimation unit 23. The scale correction unit 22 utilizes a three-dimensional distribution of pixels of the image of the reference object 15 having a known length, a known width and a known height, to establish a back-projection model between the image and the measurement environment 12 so as to calibrate the scale for estimating sizes of other objects. In one embodiment, 3D object size estimation system 20 further comprises a user interface 24. The user can input the three-dimensional size information of the reference object 15 through the user interface 24 so that imaged areas of the reference object 15 in the image data can be extracted. The extracted area information and the standard size information of the reference object 15 can be used to establish the back-projection model between the image and the measurement environment 12. In one embodiment, the scale correction unit 22 further comprises an image analysis unit 221 and an environment model construction unit 222. The image analysis unit 221 analyzes the image data provided by the image capturing unit 21 to extract an image of the reference object 15 within the image. The environment model construction unit 222 finds a correspondence between the image and the measurement environment 12 according to image of the reference object, to establish the back-projection model between the image and the measurement environment 12. In one embodiment, the 3D object size estimation system comprises an output interface for outputting data, wherein the output interface comprises at least one of a RS232 port, a wireless channel such as WiFi and an Ethernet port for connecting to Internet.

Figure 3:
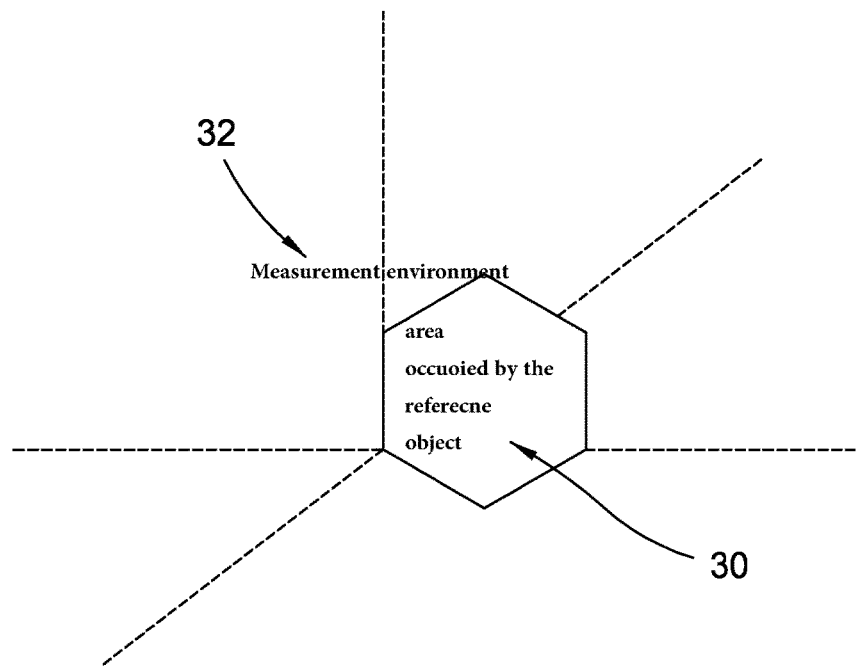
FIG. 3 is a schematic view of the projection of a reference object in a virtual measurement environment model in accordance with one embodiment of the present invention.

After the back-projection model is established, the information of the back-projection model is transmitted to the object size estimation unit 23 for subsequent estimation. Please refer to FIG. 3 which is a schematic view of the reference object 15 projected in the virtual measurement environment model. As shown in FIG. 3, the area occupied by the hexagon 30 at the central area can represent the space occupied by the reference object 15 in the virtual measurement environment 32, so that a spatial size occupied by the reference object 15 can be calculated according to the back-projection model. The correspondence between the pixels of the image and the measurement environment 12 can be calculated. The object size estimation unit 23 performs an algorithm to detect the position of the object 16 in the measurement environment 12 according to the image data of the object 16 provided by the image capturing unit 21, and search the position of a specific feature of the object 16 to obtain the pixel position of the specific feature imaged in the image. The spatial relationship of the position of these features in the image is provided to a self-calibration algorithm to estimate the spatial size of the object 16. The scale relationship between the measurement environment 12 and the camera device 11 can be calculated automatically according to the 3D imaging theory, so that the self-calibration of the measurement environment 12 can be completed.

Figure 4:
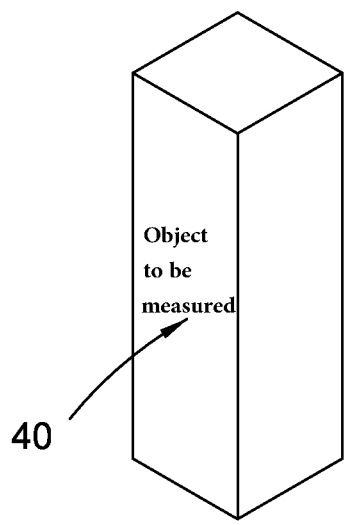
FIG. 4 is a schematic view of an object to be estimated object which has a different size from the reference object in accordance with one embodiment of the present invention.
Figure 5:
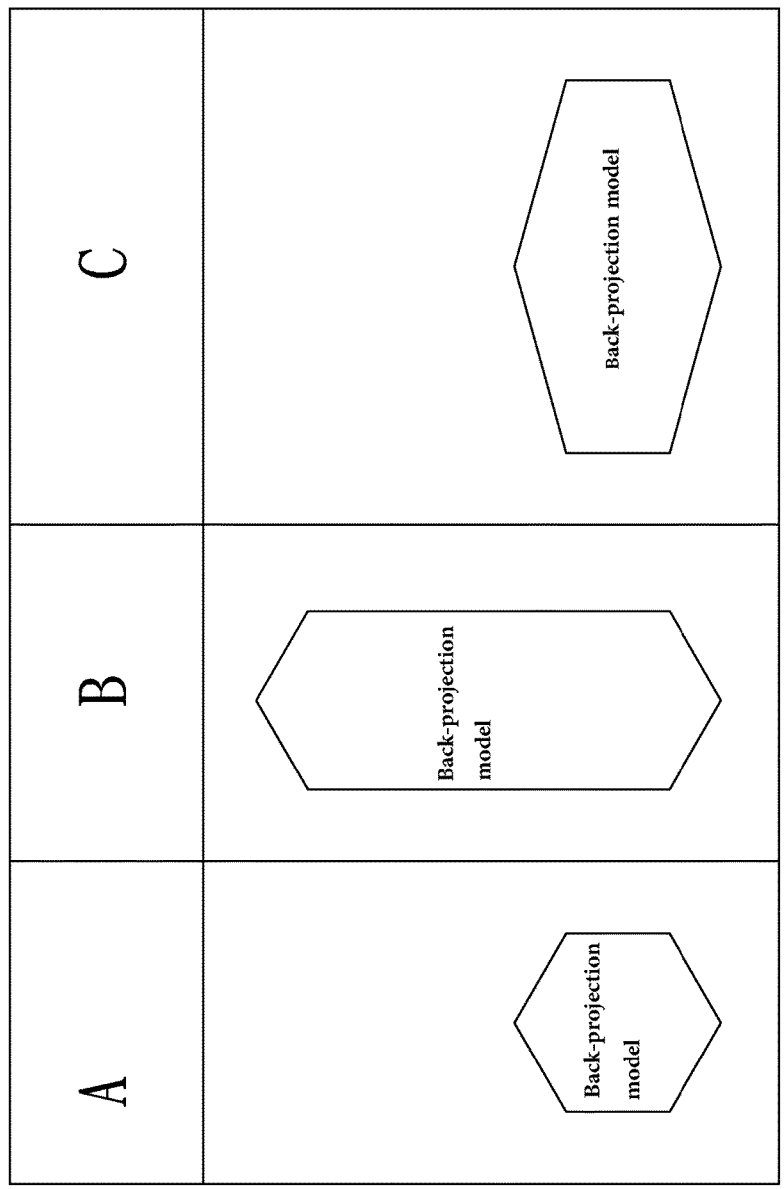
FIG. 5 is a schematic view of adjusting parameters of the back-projection model in accordance with one embodiment of the present invention.
Figure 6:
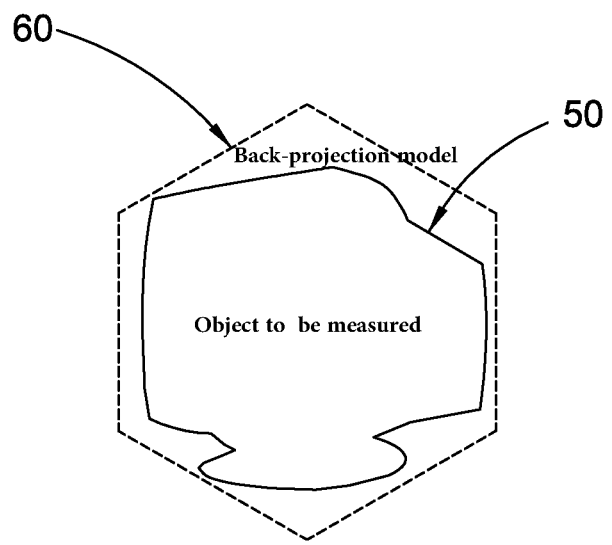
FIG. 6 is a schematic view of the adjusted parameters of the back-projection model to match the size of the object to be estimated in accordance with one embodiment of the present invention.

When the object size estimation unit 23 measures an object with a size that is different from the reference object 15, such as the object to be measured 40 shown in FIG. 4, the three-dimensional parameters of the length, the width, and the height of the back-projection model can be adjusted, as shown in FIG. 5. If only the vertical axis parameter is adjusted, the schematic view representing the back-projection model is adjusted from the part (A) to long hexagonal back-projection model shown in part (B), and its occupied area corresponds to the occupied space in the virtual measurement environment 32. If only the length parameter and width parameter are adjusted, the back-projection model is adjusted from the part (A) to wide flat hexagonal back-projection model shown in part (C), and its occupied area corresponds to the occupied space in the virtual measurement environment 32. By adjusting the three-dimensional parameters of the length, width and height of the back-projection model and comparing results of matching the adjusted back-projection model with the image area of the captured object 16, as shown in FIG. 6, the outer frame formed by the dashed line represents the schematic view of the adjusted back-projection model, in such situation, the corresponding three-dimensional parameters of the back-projection model 60 serves as the spatial size occupied by the object 50. By adjusting the three-dimensional parameters of the back-projection model 60 by which a virtual space frame can be constructed for each inputted images, wherein the size and the angle of the virtual space frame can be modified so as to completely cover the image area of the object 16 by a minimal area, so that the size of a space 12 that is taken by the object 40 can be obtained.

Figure 7:
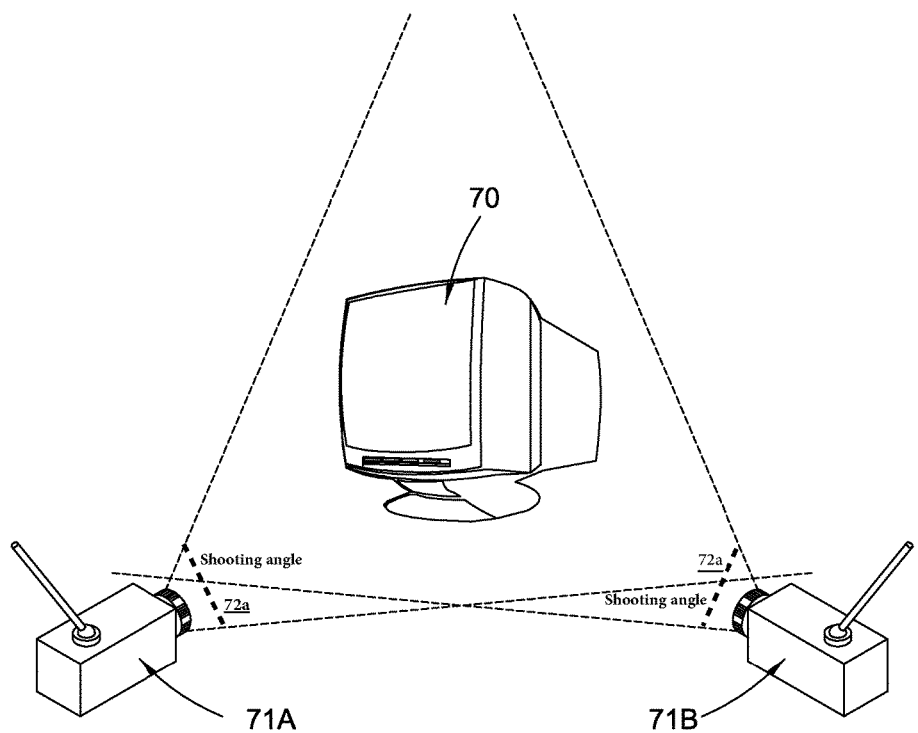
FIG. 7 is a schematic view of the object to be estimated with an irregular shape and the camera to capture the image of the object in accordance with one embodiment of the present invention.

However, it is difficult for the estimation system to use just a single camera to establish the back-projection model for an object in a non-rectangular shape due to the shooting angle of the single camera. Therefore, different shooting angles will cause different estimation results. Taking FIG. 7 as an example, camera 71A is used to capture the image of the object 70 to be estimated; the captured image is the same as that of the FIG. 4, and a part of the lower end being more protruded than the upper end of the object 70 cannot be shot due to the shooting angle 72*a* of the camera 71A, which results in the estimated spatial space occupied by the object 70 being close to the estimated spatial space occupied by the object 40. By shooting the object 70 via the camera 71B with a shooting angle 72*b*, the obtained image data includes the part of the lower end being more protruded than the upper end, and the estimated spatial space occupied by the object 70 will be different from the estimated spatial space occupied by the object 40.

Figure 8:
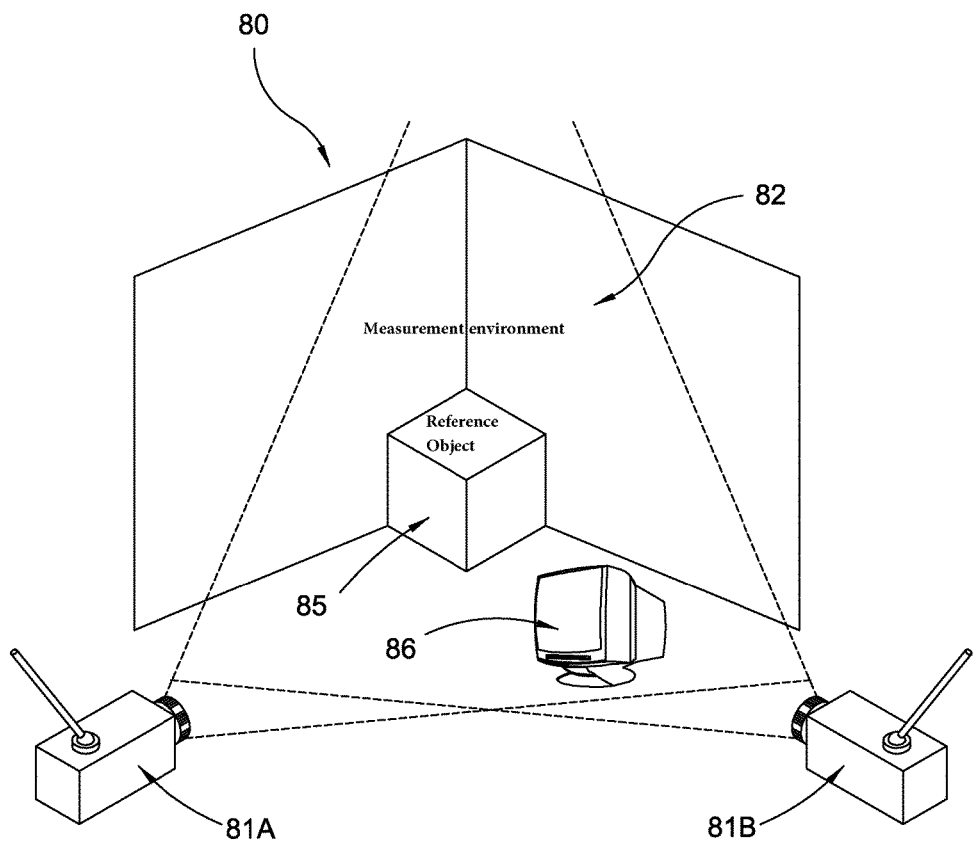
FIG. 8 is a schematic view of constructing the measurement environment of the system having self-calibration function for estimating three-dimensional packaging size by using multiple cameras in accordance with one embodiment of the present invention.

In order to prevent errors in the estimation of the spatial size occupied by an object, two or more cameras can be used in the measurement environment to inspect the object from multiple angles, and the minimal combination of the cameras for completely covering the object can be derived according to the inspecting angle, so as to obtain the correct estimation result. FIG. 8 displays the measurement environment 82 of the image based object wrapping estimation system 80 having a self-calibration function, and two cameras 81A and 81B are used for capturing images. In the flow of operations, the image capturing unit 21 having two cameras 81A and 81B is used to obtain the image data of the measurement environment 82. The image capturing unit 21 also incorporates functions of image capturing, analysis and recognition as well as communication. A reference object 85 is placed in the measurement environment 82, and the obtained image data of the reference object 85 is then transmitted to the scale correction unit 22; and the size information of the reference object 85 inputted by the user via the user interface 24 is transmitted to the scale correction unit 22. After the scale correction unit 22 receives the image data, the image analysis unit 21 is used to analyze these images and extract the areas of the reference object 85 in the image. The extracted areas of the reference object 85 are transmitted to the environment model construction unit 222. The extracted area information is integrated with the three-dimensional size information of the reference object 85 to establish a back-projection model between the image of the reference object 85 and the measurement environment 82. When a self-calibration analysis is performed on images captured by two cameras 81A and 81B, the system can obtain a back-projection model between each of the cameras 81A and 81B and the measurement environment 85 respectively.

When an object with a size different from the reference object 85 is measured, as shown in FIG. 8, the image data is transmitted to the object size estimation unit 23 by the image capturing unit 21, and the object size estimation unit 23 extracts the object image area in the image data via the image analysis unit 221 and transmits the information of the object image area back to the object size estimation unit 23. The object size estimation unit 23 adjusts the three-dimensional parameters of length, width and height of each of the back-projection models with respect to the image area of the object 86 captured by the cameras 81A and 81B, respectively; and compares the matching results of covering the back-projection models on the image area of the object 86 to obtain the spatial size of the object 86, wherein the spatial information obtained from the image data of one camera must be superimposed on the analysis results obtained from the image data of the other camera. By adjusting the three-dimensional parameters of the back-projection model by which a virtual space frame can be constructed for each inputted images, wherein the size and the angle of the virtual space frame can be modified so as to completely cover the image area of the object 86, provided by the image analysis units 221, by a minimal area, so that the size of a space that is taken by the object 86 can be obtained.

Taking FIG. 8 as an example, if the object image areas captured by the two cameras completely match the information of the back-projection model, the spatial size calculated based on the parameters of back-projection model is the spatial size occupied by the object 86.

However, if the object image area captured by a particular camera is larger than the parameters of the back-projection model, the parameters of the back-projection model must be enlarged to accommodate the object image area extracted from the image captured by that particular camera, and a matching process is performed between the enlarged back-projection model and the object image areas extracted from each camera until all the object image areas can be accommodated by the enlarged back-projection model, so as to obtain the spatial size occupied by the object 86.

The image based object wrapping estimation system 10, having self-calibration function and two cameras for capturing images, is good for objects having protrusion parts. However, for some objects with special shapes, more cameras are required to obtain image data from different angles, so as to obtain better estimation results. The operating mode of the measurement environment established by using more than two cameras is similar to the embodiment shown in FIG. 8, but the object size estimation unit 23 requires a larger amount of computation. For example, adjusting the status of each back-projection model, the matching between the object image areas extracted in each camera and each back-projection model must be considered. The adjusted back-projection model must also match the object image areas extracted from the images captured by all cameras, so that the spatial size occupied by the object with special shape can be calculated with better precision.

Figure 9:
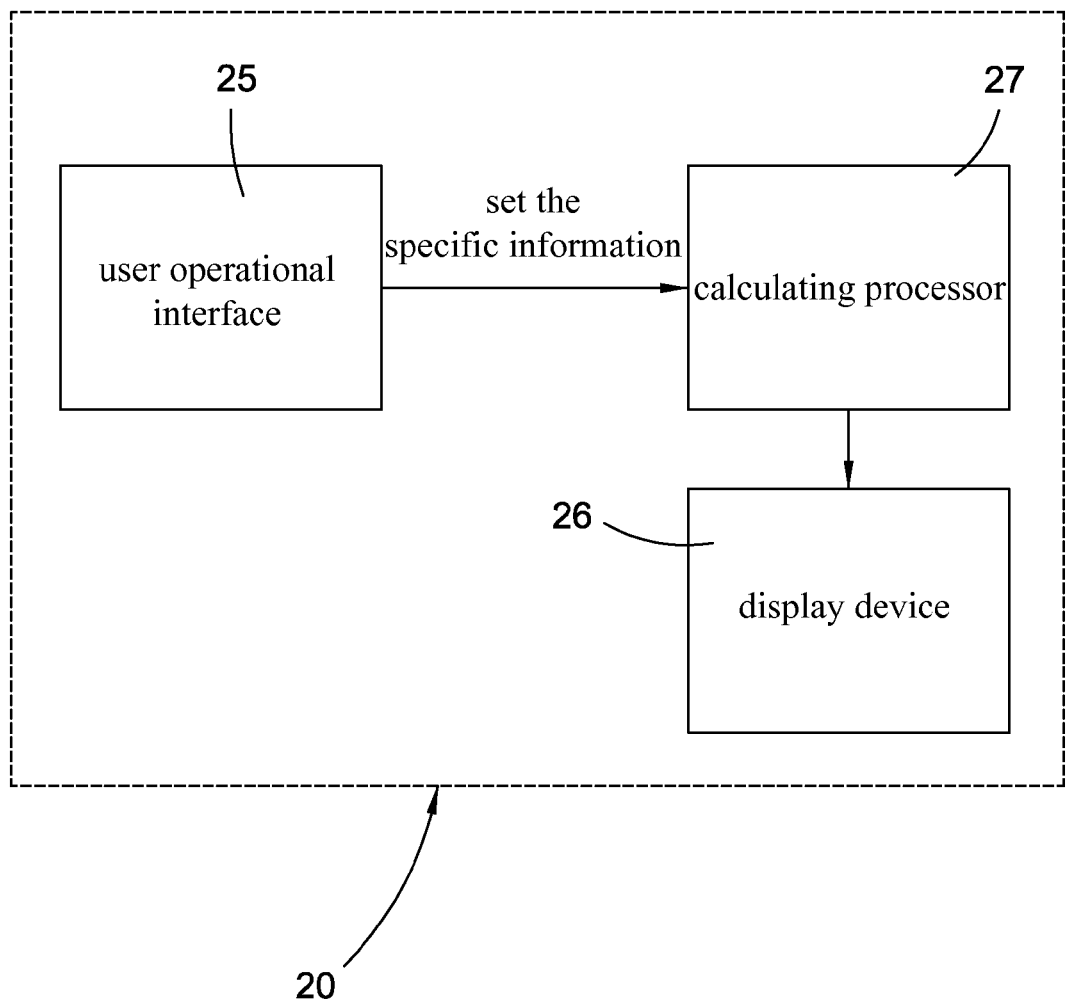
FIG. 9 is a block diagram of the system for estimating three-dimensional packaging size in accordance with one embodiment of the present invention.

Please refer to FIG. 9. The 3D object size estimation system 20 of the present invention further comprises a processor 27, a user interface 25, and a display device 26. The processor 27 is operative to process all calculations for image and space transformation. The user can set the related information for the measurement environment via the user interface 25. The display device 26 is operative to display the information of the user interface 25 and the measurement results. The three-dimensional distribution of the length, the width, and the height of the reference object 15 in the image is used to obtain the information of the spatial scale to calibrate the scale. In addition, the user interface 25 and the display device 26 can allow the user to set the length, width and height of the reference object 15 and obtain the measurement results. The user interface 25 can be a character description representation, an image data representation, a number sequence representation, or a combination of the characters description, the image data and the number sequence. The 3D object size estimation system 20 of the present invention can be integrated with a combination of a barcode scanning device, an electronic scale, or character recognition device system to obtain complete object information, and can be applied to a receiving process in logistic, postal delivery, aviation transport for quickly estimating the space taken by a good to valuate and estimate delivering costs. In one embodiment, the 3D object size estimation system 20 further comprise an output interface, wherein the output interface comprises at least one of a RS232 port, a wireless channel and an Ethernet port for connecting to Internet.

In addition, the 3D object size estimation system 20 of the present invention can also be integrated with a database, wherein the system can collect and organize the information of object features. For example, the size of the object can be obtained by image analysis, and the object image, size and other information can also be obtained at the same time. The information is then exported and recorded to a database. These records can also be provided to subsequent processes for cost analysis or object status tracking.

The above-mentioned descriptions represent merely the exemplary embodiment of the present invention, without any intention to limit the scope of the present invention thereto. Various equivalent changes, alternations or modifications based on the claims of present invention are all consequently viewed as being embraced by the scope of the present invention.

What is claimed is:

1. A method of estimating the three-dimensional size of an object for packaging or storing the object, the method comprising:
   providing first three-dimensional image data of a measurement environment and a reference object with a known length, known width and known height in the measurement environment;
   constructing a back-projection model by finding a correspondence between the first three-dimensional image data of the reference object with the known length, known width and known height and the measurement environment to construct a back-projection model;
   providing second three-dimensional image data of the measurement environment and an object to be estimated in the measurement environment; and
   detecting a position of the object to be estimated in the measurement environment in said second three-dimensional image data; and
   using a virtual space frame in the back-projection model with a shape of a box to enclose the object to be estimated therein so as to determine a three-dimensional size for packaging or storing the object to be estimated in accordance with the three-dimensional size of the box.

2. The method according to claim 1, wherein the reference object has a rigid body with a shape of a cuboid or cubic.

3. The method according to claim 1, further comprising outputting data through an output interface, wherein the output interface comprises at least one of a RS232 port, a wireless channel and an Ethernet port for connecting to Internet.

4. The method according to claim 1, further being applied to detect a volume of a cuboid object.

5. The method according to claim 1, further comprising using at least one of a barcode scanning device, an electronic scale and a character recognition system, to obtain information of an object.

6. The method according to claim 1, further being applied to a logistic process to estimate a space taken by each good to valuate and estimate delivering costs.

7. The method according to claim 1, further being applied to a receiving process in postal delivery of goods to estimate a space taken by each good to valuate and estimate delivering costs.

8. The method according to claim 1, further being applied to a receiving process in aviation transport of goods to estimate a space taken by each good to valuate and estimate delivering costs.

* * * * *